(12) United States Patent
Swistak et al.

(10) Patent No.: US 7,585,130 B2
(45) Date of Patent: *Sep. 8, 2009

(54) LEACHING CHAMBER WITH INWARD FLARING SIDEWALL PERFORATIONS

(75) Inventors: Daniel J. Swistak, Newmarket, NH (US); James J. Burnes, Deep River, CT (US)

(73) Assignee: Infiltrator Systems, Inc., Old Saybrook, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/677,772

(22) Filed: Oct. 1, 2003

(65) Prior Publication Data

US 2005/0074286 A1    Apr. 7, 2005

(51) Int. Cl.
*E02B 11/00* (2006.01)
*F16L 9/12* (2006.01)

(52) U.S. Cl. .............................. 405/43; 405/46; 405/49; 138/105

(58) Field of Classification Search ............... 405/36, 405/43–46, 48, 49, 50; 138/105, 121, 128; 210/170, 747
See application file for complete search history.

(56) References Cited

U.S. PATENT DOCUMENTS

| | | | | | |
|---|---|---|---|---|---|
| 980,442 | A | * | 1/1911 | Schlafly | 405/48 |
| 4,523,613 | A | * | 6/1985 | Fouss et al. | 138/121 |
| 4,626,129 | A | | 12/1986 | Kothmann et al. | 405/43 |
| 4,759,661 | A | * | 7/1988 | Nichols et al. | 405/48 |
| 5,046,892 | A | * | 9/1991 | Kothmann | 405/43 |
| 5,441,363 | A | * | 8/1995 | Gray | 405/49 |
| 5,511,903 | A | * | 4/1996 | Nichols et al. | 405/43 |
| 5,556,231 | A | * | 9/1996 | Sidaway et al. | 405/48 |
| 5,890,838 | A | | 4/1999 | Moore, Jr. et al. | 405/49 |
| 6,854,925 | B2 | * | 2/2005 | DiTullio | 405/49 |
| 7,189,027 | B2 | * | 3/2007 | Brochu et al. | 405/43 |
| 7,396,188 | B2 | * | 7/2008 | Brochu et al. | 405/49 |
| 7,419,331 | B2 | * | 9/2008 | Brochu et al. | 405/43 |

OTHER PUBLICATIONS

E. Nessler, "Statement About Mini Chamber" With Exhibit A, Jan. 11, 2006.
The Maximizer™ Chamber System for Stormwater Management, Infiltrator Systems, Inc (1995) 4 Page Brochure.
Declaration of Ronald Brochure, Dec. 18, 2006 (3) Pages.
"The Maximizer Chamber System for Storm-Water Management" Infiltrator Systems, Inc. (1995) (4) Page Brochure.
"Ground Water and Wells" Edward E. Johnson, Inc (1966) pp. 295-299; Cover Page; (6) Pages Total.
Notice of Dismissal Pursuant to F.R.C.P. 41(a)(1), Apr. 23, 2007.

(Continued)

*Primary Examiner*—Tara Mayo-Pinnock
(74) *Attorney, Agent, or Firm*—C Nessler (57) ABSTRACT

A leaching chamber has sidewall perforations which flare inwardly, so that the smallest perforation dimension is on the exterior surface of the sidewall. The basic axes of the perforations run downwardly toward the chamber base, as the axes run from the inside to outside of the chamber. Mold cores having inwardly retracting slides, and which move in complex ways, are used to form the chamber. Thus, perforations are present down near the base flange of the sidewall, even though the base flange has an upwardly extending fin.

14 Claims, 5 Drawing Sheets

OTHER PUBLICATIONS

Withdrawal (of Plaintiff's Action), Apr. 23, 2007.
Withdrawal (of Counterclaim), Apr. 23, 2007.
Opposition to Defendant's Motion for a Stay, Apr. 20, 2007.
Defendant's Memorandum of Law in Support of Its Motion In Limine to Preclude Testimony Regarding Defendant's Chapter 11 Bankruptcy Filing and the Maximizer Product, Apr. 16, 2007.
Motion for Protective Order to Preclude David A. Potts from Testifying as an Expert, Apr. 9, 2007.
Motion for Protective Order to Preclude Plaintiffs from Offering Evidence That Defendant's Actions Subsequent to 2002 May Have Adversely Impacted Plaintiffs' Ability to Obtain a Patent for Plaintiffs' Alleged Concepts, Apr. 9, 2007.
Complaint, Apr. 9, 2007.
Plaintiff's Disclosure of Rebuttal Expert Witness, Apr. 5, 2007.
Plaintiff's Supplemental Opposition to ISI's Motion to Preclude the Testimony of Anthony P. Dello, Apr. 4, 2007.
Court Transcript, Apr. 4, 2007.
Defendant's Disclosure of Expert Witnesses Jordan Rotheiser, Devo Seereeram and George Tchobanoglous, Mar. 26, 2007.
Court Transcript, Mar. 23, 2007.
Defendant's Motion to Preclude the Testimony of Anthony P. Delio, Mar. 20, 2007.
Plaintiff's Opposition to Defendant's Motion to Compel, Mar. 14, 2007.
Defendant's Memorandum of Law in Support of its Motion to Compel, Mar. 2, 2007.
Plaintiff's Disclosure of Expert Witnesses, Mar. 1, 2007.
U.S. Army Corps of Engineers "Drainage and Erosion Control," Part XIII, Chapter 2 (Jun. 1955) 36 pages.
Cedegren, H. R "Septage, Drainage, and Flow Nets" Wiley & Sons (1988) p. 154-157.
U S Bureau of Reclamation "Design of Small Dams" (1973) p. 234-236.
ASTM International Standard D5092-04 "Standard Practice for Design and Installation of Ground Water Monitoring Wells" (2004) 16 pages.
Defendant's Motion for a Stay, Apr. 12, 2007, 148 pages.

* cited by examiner

LEACHING CHAMBER WITH INWARD FLARING SIDEWALL PERFORATIONS

TECHNICAL FIELD

The present invention relates to leaching chambers, particularly to chambers made by injection molding of thermoplastic.

BACKGROUND

The present invention is particularly useful for constructing leaching chambers made of molded thermoplastic, which chambers are buried underground for use, and which chambers have been in widespread use with small domestic and industrial wastewater treatment systems for a number of years. See U.S. Pat. No. 4,759,661 of Nichols et al. Such type chambers may also be used for draining earth or other media.

Leaching chambers used heretofore have various kinds of sidewall perforations, to enable waters received in the chamber to percolate into the soil. Some prior art chambers have plain round holes and are overlaid with geotextile (water permeable woven or non-woven fabric, also called filter fabric) to prevent the infiltration of soil into the chamber interior. The present invention improves upon arch shape cross section molded chambers of the prior art which have downward sloping slots in the sidewalls, which chambers are intended to be functional without the use of geotextile. The conventional approach in the art has been to shape the slots and chamber sidewalls so that the slot bottoms are downwardly sloped, and so that the slot depth is sufficient to inhibit soil entry into the chamber interior. The prevalent approach has been to provide louvers above and below the opening of each slot. The effect of that is to increase the thickness of the sidewall of the chamber and thus the slot depth, compared to the thickness of the wall where there are no slots, and often, compared to regions laterally adjacent to the slots. For example, the sidewall thickness at louvers may be around 0.5 inch, when the wall elsewhere is about 0.130 inch. However, the approach increases chamber weight and cost.

A typical prior art slot has a downward sloping bottom surface and a horizontal or downward sloping upper surface. Typically, prior art injection molded plastic chambers are made in a two part mold, comprised of a core male part and a cavity female part; and the slides move in and out within the cavity part, to create the slots. The slots in prior art injection molded chambers are made by having slides, i.e., movable mold parts, which penetrate into the space in the mold which defines the chamber article, from the outer or cavity portion of the mold, i.e., that which forms the exterior surface of the chamber. The slides that define the slots typically have a draft, typically 3 degrees or more, for convenience of withdrawal of the slide from the molded part. Thus, the resultant slot will have outward flare, even if intended to be straight. Some prior art designs slope the bottom surface of the slot more than the top, so the outward flare will be greater than draft considerations dictate.

Now, it is desirable to improve upon the prior art technology, and to make chambers having sidewalls which are lighter than heretofore, and which have shorter length slots or other perforations.

SUMMARY

An object of the invention is to improve the construction and performance of molded thermoplastic leaching chambers, particularly those having sidewalls with a multiplicity of slots. Another object is to provide chambers with perforations that have improved resistance to soil intrusion. A further object of the invention is to provide method and means for making chambers having inwardly flaring perforations, particularly slots.

In accord with the invention, a leaching chamber has a multiplicity of inward flaring perforations in the chamber sidewall. Preferably, the perforations are downward sloping horizontal slots with an included angle of flare of about 2 to 12 degrees.

In further accord with the invention, a leaching chamber has a multiplicity of inward flaring perforations, preferably slots, in the sidewall. And the elevation of the lower slots is such than an extension of the basic axes thereof intersects an upward extending fin running along the sidewall from a lengthwise running base flange of the chamber.

In accord with the invention, a leaching chamber is made by a mold which comprises a core part and a mating cavity part. The core part has slides, with projections which define perforations in the chamber sidewall. After plastic has been injected into the mold to form the part, the slides move inwardly, preferably simultaneously upwardly, along the projections of the basic axes of the perforations in the chamber sidewall.

Preferably the mold has a core part comprised of opposing slides, movable of a floating plate, positioned between a core part base plate and the mating cavity part. A center wedge block is positioned between the slides during molding, to form the top of the chamber. After molding, the block moves down, away from the chamber top, to thereby provide space for the inward movement of the slides. The motion of the wedge block and the slides is accomplished by the effects of shafts extending from the base plate, when the floating plate and the base plate move in a pre-determined way.

Chambers made in accord with the invention are particularly light and strong. The perforation shape provides an unexpected advantage over outward flaring downward-sloping slots of the same size, in providing superior resistance to soil intrusion during use. Another advantage of the invention is that more slots may be placed on any given sidewall, when there is an upward running fin of other structure running along the base flange of the chamber.

The foregoing and other objects, features and advantages of the invention will become more apparent from the following description of preferred embodiments and accompanying drawings.

DESCRIPTION

This application has relation to U.S. patent application Ser. No. 10/677,938 of R. Brochu et al., entitled "Corrugated Leaching Chamber" filed on Oct. 1, 2004. The Brochu et al. application describes an improved corrugated leaching chamber having a continuous curve arch shape cross-section and a thin slot-perforated sidewall, where slots preferably are inwardly flared. This present application also has relation to two U. S. patent applications of Krueger et al., namely Ser. No. 09/849,768 filed May 4, 2001 and Ser. No. 10/402,408, filed Mar. 28, 2003. The Krueger applications describe, for a stormwater chamber, a corrugated arch cross section shape and base flange construction, which are useful in the present invention. The description and drawings of the foregoing applications, particularly with respect to what they teach about the aforementioned features, are hereby incorporated by reference.

A new leaching chamber is highly engineered and requires accurate and reproducible dimensions, when made by injection molding of thermoplastic, in particular, a polyolefin. A typical chamber is about 33 inch wide at the base, 16 inch high, and about 48 inch long. The wall thickness is in the range 0.090 to 0.125 inch. Chambers having other dimensions may be constructed using the present invention. The chamber described in the related Brochu application may have various different sidewall perforations. Preferably, the perforations are tapered so that they flare inwardly, toward the interior of the arch shape chamber, as described herein.

In the present invention, a chamber is preferably formed by gas assisted injection molding in a cooled metal mold. See U.S. Pat. No. 5,401,459 of Nichols and the references therein for information about gas assisted injection molding, a commercially known process. Alternatively, other conventional injection molding processes may be used. The chamber may be made from commercial polypropylene or high density polyethylene, and variations or modifications thereof. An exemplary material is Fortilene TG6801 Polypropylene from BP Amoco in Naperville, Ill., US.

Chambers in the prior art have perforations which flare outwardly; and, slot height is greater at the exterior surface of the sidewall compared to the interior surface. See perforation 30F in FIG. 4. Slot width, the dimension of the opening which is parallel to the chamber length axis and to the plane of the chamber base, is typically several multiples of the slot height. The wall thickness of the sidewall 40 is around 0.150 inch and may vary gradually with elevation. Chambers with outward flaring holes may be molded using technology which is familiar. In particular, the slots are formed by slides which retract into the cavity part of the mold. Typically, slides are moved by either heavy duty hydraulic cylinder actuators at periphery of the cavity or a mechanical angled pin device.

Figures 1, 2:
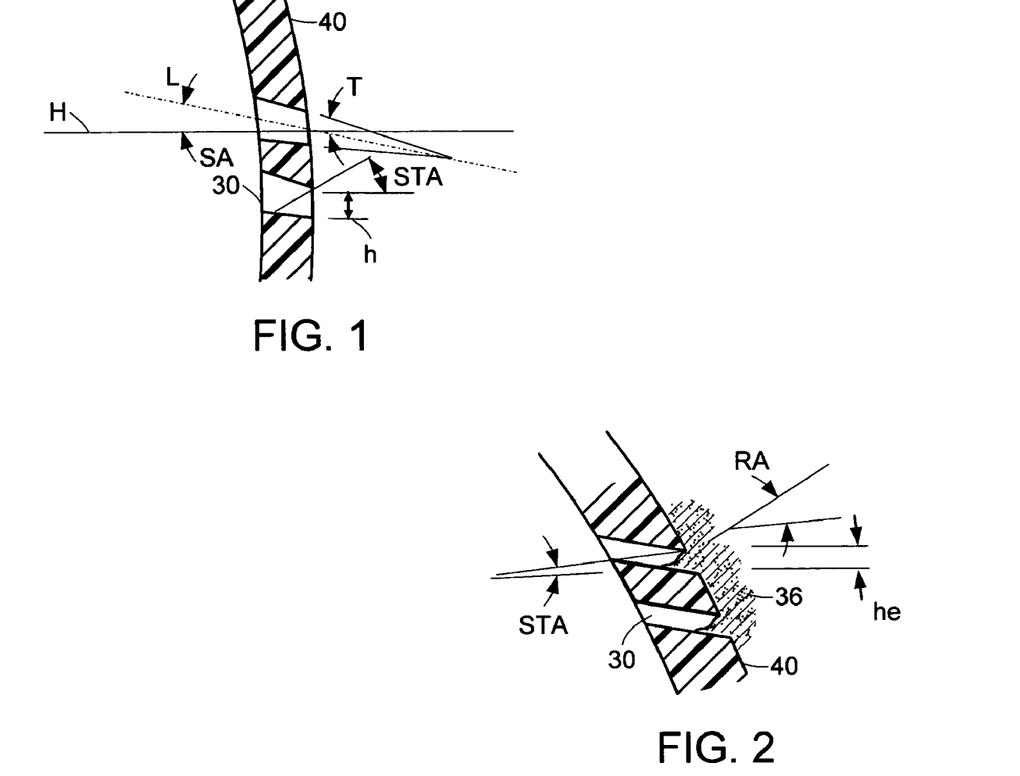
FIG. 1 is a vertical cross section through a portion of the sidewall of a molded leaching chamber, showing inwardly flared slot perforations.
FIG. 2 shows a portion of a sidewall having constant cross section slots, to illustrate parameters which affect slot design and utility.
Figure 4:
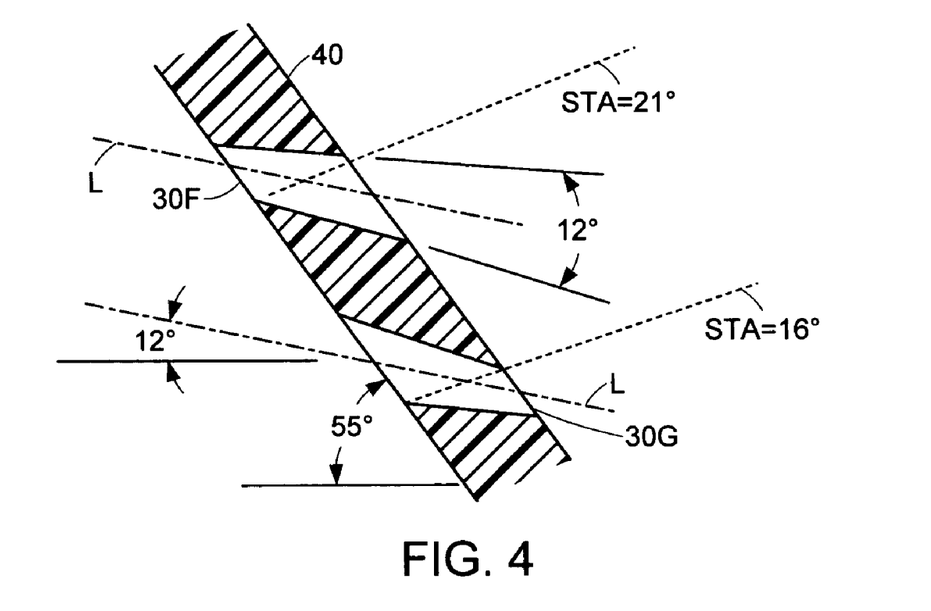
FIG. 4 shows how an inward flared slot provides a higher Soil Threshold Angle than does an outward flare slot.

FIG. 1 shows a segment through a sidewall of a chamber, more fully described in the related Brochu et al. application, and the preferred inward flare slot configuration of the present invention. (As shown in FIG. 4 therein, the chamber has perforated sidewalls and a solid top.) It also illustrates some significant parameters of sidewall perforations. The top and bottom surfaces of slot 30 diverge with slot depth, moving from exterior sidewall surface to interior surface. (Depth may alternately be referred to as the through-sidewall length). Slot height h changes with slot 30 depth; the slot height $h_e$ at the exterior wall surface is the minimum slot height. Thus, slot 30 is called an inwardly flared or inward flaring slot. The average height and width may vary from slot to slot within any chamber and amongst slots of different chambers as described in the related patent application. Generally, the slots are horizontal slots, that is the width is greater than the height. The foregoing invention principles may be applied to other shape perforations than slots, for instance, to square, round and generally oblong openings.

In a preferred embodiment, wall thickness varies with elevation. With reference to FIG. 1 and FIG. 2 (discussed below), in a preferred configuration of chamber and sidewall, the centerline axis L of typical slot 30 runs at angle SA of 12 degrees to the horizontal H. The top and bottom of the slots are sloped relative to axis L, at nominal 6 degree angles T. Thus, the included angle of between the slot top and bottom surfaces, i.e., the flare, is about 12 degrees. The slot height $h_e$, measured vertically, at the slot sidewall exterior, is about 0.070 inch. The height of the slot at the inside of the sidewall will range between about 0.105 to about 0.200 inch, reflective of the combination of flare and varying wall thickness. The edge to edge spacing of adjacent slots in the vertical direction is about 0.100 inch, such dimension varying somewhat with the slot elevation from the base. The basic axis L is the mean line of the slot. A slot having a tapered top and bottom that is symmetrical about the basic axis L is preferred. Asymmetric slot tapers are within contemplation. While the flared top or bottom of the slot are preferably planar, curved or stepped top and bottom surfaces, for which the mean path comports essentially with the basic axes of the flared openings described herein, may be made.

Figure 3:
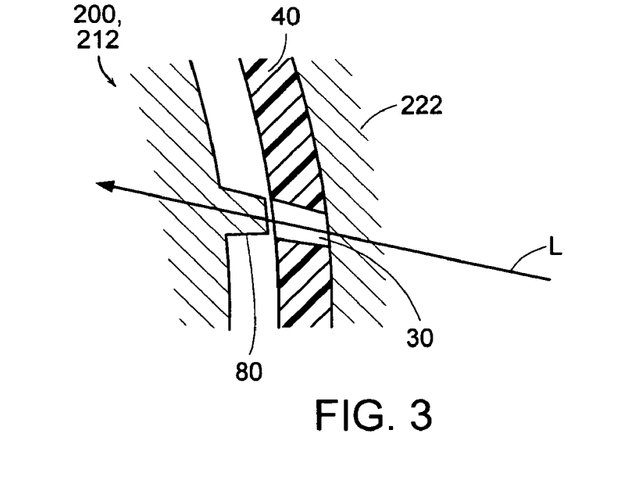
FIG. 3 is a vertical cross section through a portion of the mold assembly which is used to form the sidewall shown in FIG. 1.

In practice of the invention, the included angle of flare may vary. It will be at least 2 degrees, preferably between 2 and 16 degrees, most preferably 12 degrees. Likewise, the slope angle SA of the centerline axis may vary, provided it will slope downwardly FIG. 3 is a fragment of a cross section showing a chamber sidewall 40 having inwardly flared slot 30, as the chamber sidewall is formed within the mold, between core part 212, 200 and cavity part 222. The mold is described further below. A plurality of tapered projections 80, one of which is shown, extend from a movable slide 212 of the core assembly 200, to define the slots. They move as indicated by the arrow in the figure. At the time plastic is injected they are advanced, so the projections protrude into the product cavity of the closed mold. At the point when the plastic has hardened and the mold can be opened for part removal, the slide and associated projections retract into the core, moving along the basic axis L of the slot.

Heretofore, outwardly flaring slots have been prevalent in leaching chambers. They are attractive from a certain sanitary engineering and regulatory standpoint, since the useful leaching area of a chamber is calculated based on the dimension of perforation opening at the exterior surface of the chamber sidewall. From this standpoint, the slots of the present invention may be considered somewhat disadvantageous. FIG. 2 shows essentially unflared slots, to illustrate certain slot and soil parameters, and helps understand one unexpected benefit of the invention. Soil 36 lying against the exterior of a chamber wall 40 will tend to enter into the perforation opening 30 under the influence of gravity and the soil environment, such that the innermost end of the soil lies at an angle RA, also called Angle of Repose. Angle of Repose RA is a property of the soil material in the environment of a chamber in use. To measure the common angle of repose of a granular material, the material is poured onto a horizontal surface and observed, according to a protocol.

Angle STA (Soil Threshold Angle) is the angle of the line which runs from the upper edge of the perforation at the outside of the chamber wall, to the lower edge of the perforation at the inside of the chamber wall. It is a property of the chamber. It will be appreciated from FIG. 2 that soil will not enter the chamber through slots if angle STA is less than angle RA. Thus, an angle STA that is about equal to angle RA is called the critical STA angle, $STA_c$. For the preferred chambers of the invention, slotted perforations have angle STA which is equal or less than $STA_c$. From another sanitary engineering and regulatory viewpoint, the useful leaching area of a chamber is based on the soil which is exposed in the slot, namely that lying along the slope of the angle RA or angle STA, as may be the case for a chamber. It follows that Angle STA is a function of basic slot slope angle SA, of slot depth, and of slot height $h_e$ at the slot exterior surface.

Inward flared perforations provide an unexpected advantage, when applied to chambers having inward sloping sidewalls. This is illustrated by FIG. 4, where a portion of sloped constant thickness sidewall 40 has two identical small end height slots, both having a 12 degree slope to the horizontal and a 12 degree included angle flare, like those described above. Slot 30F is outward flaring and slot 30G is inward flaring. STA for slot 30F is about 21 degrees, while STA for slot 30G is about 16 degrees, showing how outward flare slots provide a substantially higher angle STA for any given slot height and wall thickness. An important corollary is that, for any target STA, chamber sidewall thickness can be reduced, thus providing an important reduced material cost advantage, when the STA factor is the limiting parameter. If chamber sidewalls are perpendicular to the horizontal, there would be no advantage. Thus, the greater the sidewall slope, the greater the advantage of the invention.

Figure 5:
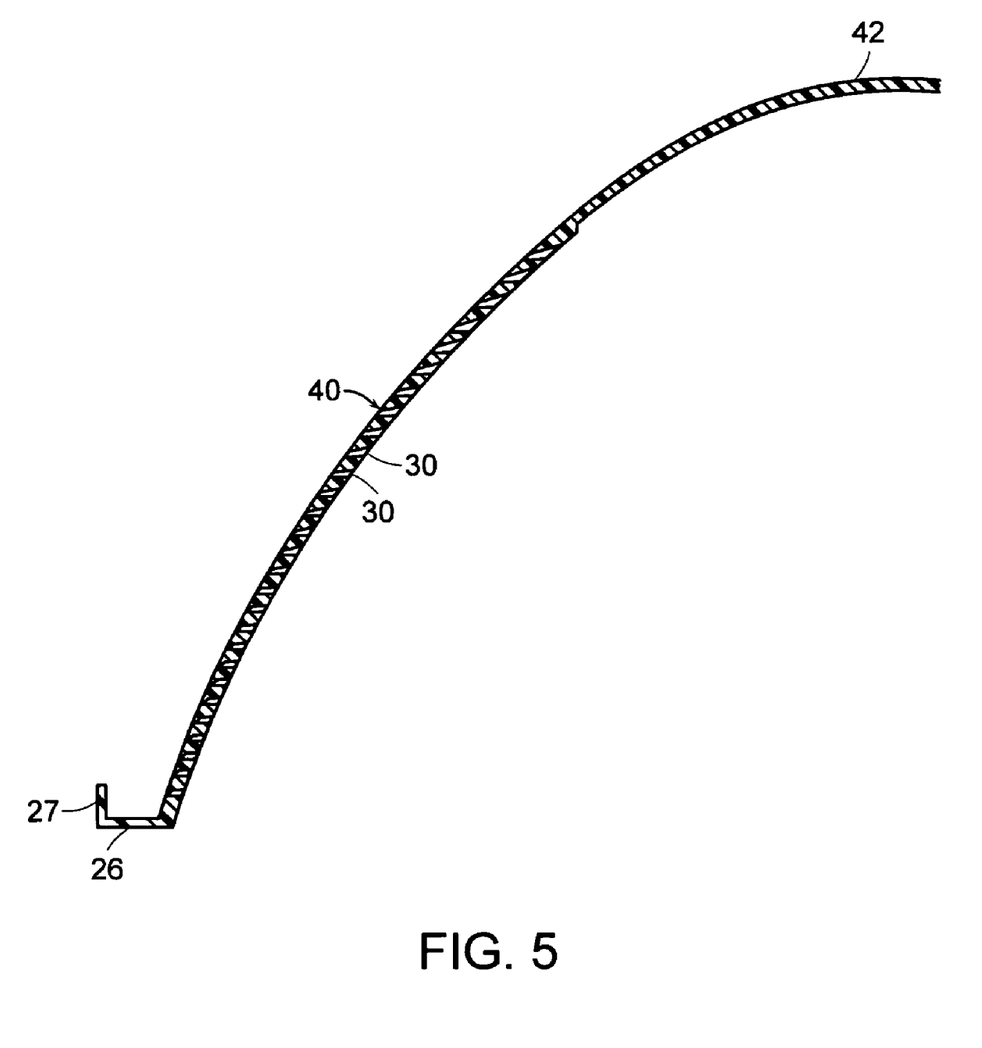
FIG. 5 is a vertical cross section through the slotted sidewall of a preferred chamber.

FIG. 5 shows in cross section a portion of the sidewall 40 of preferred design chamber, which runs from base flange 26 to un-perforated top 42. The chamber sidewall thickness t varies from about 0.150 inch at the bottom slot to about 0.175 at the top slot. The exterior surface slot height $h_e$ varies from about 0.070 inch for the bottommost slots to about 0.090 for the topmost slots, so that the design criteria $STA_c$ of 26 degrees is met by all the slots. Theoretical STA for the highest slot is about 16 degrees, in the absence of rounding of the edges of the slot top and bottom, at the interior and exterior. When such edges are provided with an about 0.020 radius the effective depth to the slot is shortened and the STA for the top slot becomes about 26 degrees. Likewise, the wall thickness at the bottom of the chamber is sufficient to compensate for the shortening of slot depth caused by edge rounding.

Figure 6:
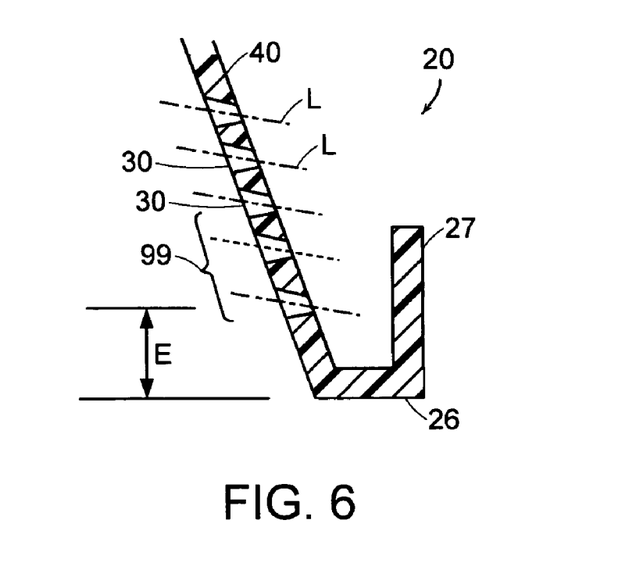
FIG. 6 shows a vertical cross section through a bottom portion of chamber having a vertically extending fin on the flange

Using the invention described to this point enables thinner chamber sidewalls, which of course could mean lower strength and less rigidity. To improve rigidity and strength along the lengthwise axis, as shown in FIG. 6, inwardly flared slots are used in conjunction with fins 27, which run lengthwise along opposing sides of the base flange 26 chamber 20, for strengthening the horizontally running base flange. Fins 27 are spaced apart a small distance from the bottom of sidewall 40. The chamber sidewall, formed in a mold having perforation defining slides which pull inwardly, both cooperates with and enables the use of strengthening fin 27 as previously described in the related Krueger et al. applications. From FIG. 6, it will be apparent that, flange 27 could not be formed at the same time as slot group 99, when using the prior art outside slide pull technology. The slide presence and motion would prevent having fin 27 extend higher than elevation E of the lowest slot (or its projection to vicinity of the fin). In the generality of this aspect of the invention, the slots may have essentially no flaring.

As described above, preferably the basic angle SA of axis L of a slot or other perforation runs downwardly, from the interior to the exterior of the chamber, most preferably at an angle of 12 degrees from horizontal. The inside pull technique is particularly useful to achieve that, when there is a fin 27, or even when the base flange 26 extends laterally outwardly a large distance. Other angles SA may be used in the invention. Angle SA, as shown, will be such that the downward slope of axis L is greater than zero. Preferably angle SA will be between 6 and 14 degrees.

It is a problem to make a core which forms inwardly flaring perforations in the chamber sidewall. Slides that retract inwardly have an incompatibility with the need to form the top interior of the chamber cross section. In the invention, the problem has been solved by a multipart core, including two slides 212 which advance and retract relative to the sidewall, and by a core part that retracts in a two-step process. The core motion is accomplished by mechanisms actuated by opening and closing of the mold in the injection molding machine.

Figure 7:
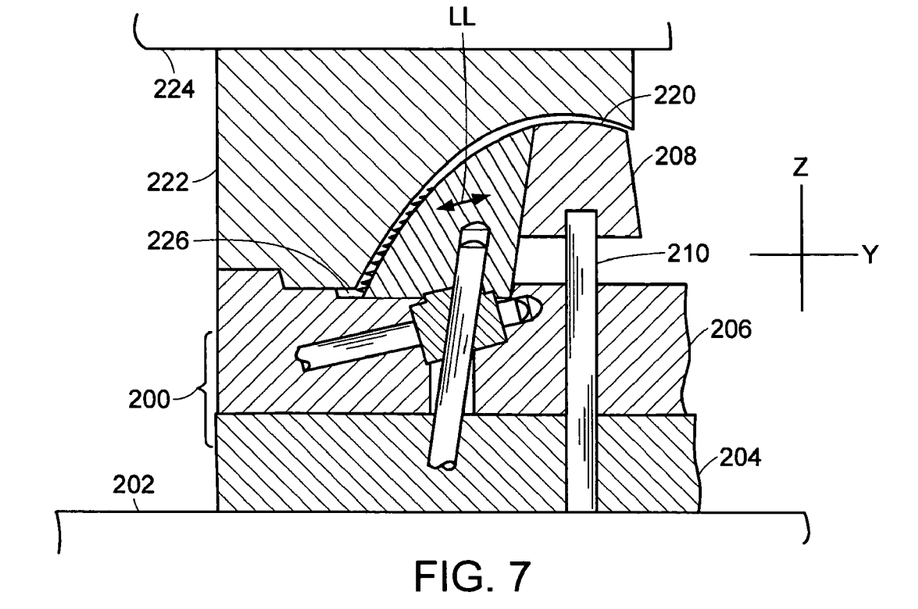
FIGS. 7 and 8 show how the core part of the mold, partly shown in FIG. 3, is constructed, with slides and a wedge that move in and out during the molding process.

The mold is comprised of a core part 200, which is an assembly, and a cavity part 222. In cross section, FIG. 6 shows the mold closed and FIG. 7 shows the mold opened. (For convenience of description, the mold is shown rotated to a horizontal position, so opening and closing is in the vertical direction. In use, the mold will be mounted in the machine so mold opening and closing is in the horizontal direction.)

The mold core part consists of five main components: base plate 204, which is fixed to one molding machine platen 202, floating plate 206, wedge center block 208, and identical left slide 212L and right slide 212R. Only the left half of the mold is shown in the Figures. Thus, slide 212R is not seen, but it will be understood it is configured like slide 212L. When the mold is closed by relative motion of cavity and core parts along the z axis in the Figure, the space 220 between the cavity mold 222 (which is attached to opposing platen 224 of a molding machine) defines the chamber arch shape cross section, when plastic is injected into the space. Space 226 forms the bottom of flange 26 of a chamber. It extends horizontally in the y-direction, and may be used as a reference for base plane elevation. Special steps, such as supplemental latches, may be used to prevent slight mold separation during injection molding.

After the chamber is formed by plastic injection, the portions of the core part assembly which define the sidewall with slots, namely, slides 212L, 212R, move generally inward in the y direction, relative to the chamber sidewalls and to each other. They move toward wedge 208. The slide motion, indicated by arrow LL, runs at angle SA relative to the reference plane of the bottom flange and to the y axis, for example 12 degrees. Direction LL is preferably parallel to the basic axis L of the projections 80 of the slide which form slots 30. See FIG. 16.

The desired slide motion is achieved by moving base plate 204 away from floating plate 206, thus creating space 230. During that step, floating plate 206 is kept in contact with cavity part 222, as by a latch. Wedge 208 is mounted on first shaft 210, which is fixed to base plate 204, passing through a clearance hole in plate 206. Thus, when space 230 is being created by mold part motion, wedge 208 moves vertically down toward floating plate 206, and away from the top interior of the molded chamber. Space 232, between the wedge and the slide, is thus created. The space enables simultaneous motion of slide 212L on an incline, up and to the right, sufficient to withdraw the projections 80 of the slide from the left sidewall of a just-formed chamber.

The motion of slides 212 is accomplished in the following manner. Slide 212L is bolted to guide sleeve 218. Sleeve 218 is slidably mounted on third shaft 228, which has an incline of LL. Inclined second shaft 214, which is fixed in base plate 204, extends upwardly through a clearance hole in plate 206, to engage a fitted bore in sleeve 218. Thus, when base plate 204 moves downwardly relative to floating plate 205, as a result of separation of the two machine platens 202, 224, space 230 is created. And the interaction of inclined second shaft 214 with sleeve 218 makes the sleeve move to the right. Since sleeve 218 is mounted on inclined third shaft 228, the sleeve also moves upwardly, that is, in direction LL. Slide 212L moves likewise, since it is fixedly attached to the sleeve 218. Slide 212L moves into a portion of the space 230, simultaneously being vacated by wedge 208. The motion of slide 212L can be varied by changing the inclination of shaft 214. In the generality of the invention, sleeve 218 can be an integral part of slide 212L.

When the motion of floating plate 206 relative to the base 204 is sufficient to retract the projections of slides 212L and 212R from the slots of the just-formed plastic chamber sidewall, the latching of mold parts 206 and 222 is released. Further motion of the platens moves the floating plate away from the cavity part, to thus expose the molded chamber and enable its removal from the mold.

The two phase motion, wherein the base plate first moves relative to the floating plate, followed by movement of the floating plate away from contact with the cavity part of the mold, can be accomplished by other means which are equivalent functionally to those described. For example, various hydraulic and mechanical actuators and latches are within the ordinary skill, and thus need not be described.

There are a multiplicity of the foregoing shafts and guide sleeves, along the length of the mold, so that the slides move evenly. Each slide may be made of separate abutted lengthwise pieces. The ends of the chamber may be formed by appropriate cavity and core part end pieces, or by separate mold elements. Ejector pins, other mechanisms and controls, within the ordinary skill of mold construction and injection molding, sufficient to achieve the foregoing functioning and motions will be understood to be present.

Figure 8:
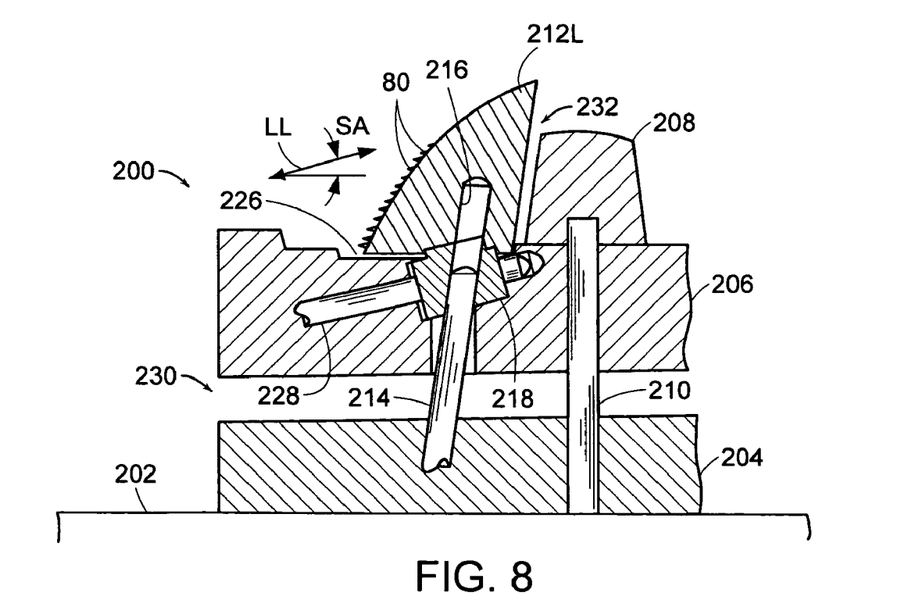
Figure 9:
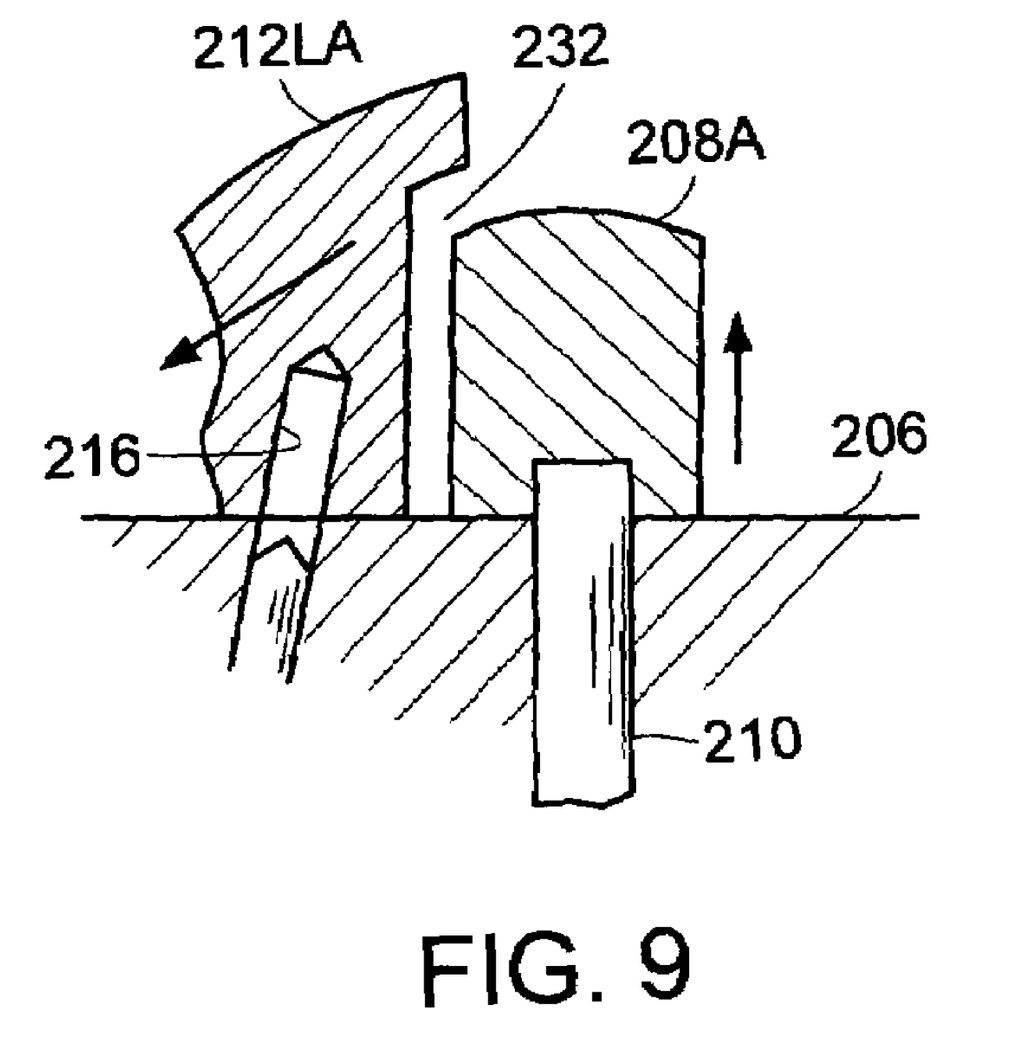
FIG. 9 is like FIG. 8, and shows an alternative core part of a mold.

Part of the reason wedge 208 has tapered sides which mate the slides is so that the gap 232 is created when the wedge 208 moves downwardly relative to the slides. In the generality of the invention, wedge 208 can be replaced by a center block having sides which are straight or otherwise shaped. For example, in FIG. 8 block 208A has straight sides and the abutting portion of slide 212LA has an undercut. Thus, slide 212LA may move into the space previously occupied by the center block, when the center block retracts.

While it is preferable to have the direction LL of slide motion correspond closely with the inclination angle SA of the basic axes of the perforations, it will be understood that the inward flare permits some deviation therefrom. And, in the special case, where those basic axis of the chamber perforations are essentially horizontal, the withdrawal motion of the slides may be in the horizontal or y direction, without any simultaneous upward motion.

Notwithstanding the advantage which has been described for inward flaring slots, it is technically feasible to make slide-defined slots with no flare or with insignificant flare. For instance, a flare having an about 2 degree included angle, would be considered essentially straight, in terms of the present invention. The mold and method which have are described here can be used to make chambers having such essentially straight slots.

While the chamber configuration invention is described in terms of making the slots during the injection molding process with use of slides, in the generality of the invention, a chamber having the inwardly flared perforations may be made by other means, although they may be more costly. For instance, slots may be punched, machined, laser cut, etc.

Although this invention has been shown and described with respect to one or more preferred embodiments, and by examples, those should not be considered as limiting the claims, since it will be understood by those skilled in the art that various changes in form and detail thereof may be made, and that equivalents thereof may be made, without departing from the spirit and scope of the claimed invention.

We claim:

1. An arch shape cross section leaching chamber which comprises: an unperforated top, a horizontal base, and an inwardly sloped and upwardly curving sidewall running from a chamber base to the top; the sidewall having a multiplicity of perforations which comprise slots that flare inwardly from the exterior surface of the sidewall to the interior surface of the sidewall; each slot having a horizontal opening length dimension which is greater than the vertical opening dimension of the slot, as said dimensions are measured at said exterior surface; the slots spaced apart horizontally and vertically and running lengthwise along the chamber; wherein the basic axes of said slots slope downwardly as the basic axes run from the inside to the outside of the chamber sidewall.

2. The chamber of claim 1, wherein said included angle of flare is between 2 and about 12 degrees.

3. The chamber of claim 2, wherein the slope of the basic axes of said multiplicity of perforations which comprise slots is about 12 degrees as measured from the horizontal.

4. The chamber of claim 1, wherein the slot heights measured at the interior of the chamber are in the range of about 0.105 inch to about 0.200 inch.

5. The chamber of claim 4, wherein the slope of the basic axes of said multiplicity of perforations which comprise slots is about 12 degrees as measured from the horizontal.

6. The chamber of claim 1, wherein the chamber further comprises: a base flange which extends outwardly from the bottom of the sidewall; and, an upwardly extending fin running along the outermost part of the base flange; wherein the extension of the basic axes of at least some of said multiplicity of slots intersects said fin.

7. The chamber of claim 6, wherein the slope of the basic axes of said multiplicity of perforations which comprise slots is about 12 degrees as measured from the horizontal.

8. The chamber of claim 1 wherein all said multiplicity of slots have a combination of slot vertical opening dimension, inward flare and downward slope axis which retards entry into the interior of the chamber of soil which is in contact with the chamber exterior during use.

9. A molded arch shape cross section leaching chamber which comprises: an unperforated top, a horizontal base, and an inwardly curving perforated sidewall running upwardly from the base to the top; the sidewall having a multiplicity of perforations which comprise slots that flare inwardly, from the exterior surface of the sidewall to the interior surface of the sidewall; each slot having a horizontal lengthwise opening dimension which is greater than the vertical opening dimension of the slot, as said dimensions are measured at said exterior surface; the slots spaced apart horizontally and vertically and running lengthwise along the chamber; wherein the basic axes of said slots slope downwardly as the basic axes run from the inside to the outside of the chamber sidewall; wherein, said horizontal base comprises a horizontal flange and an upwardly extending lengthwise fin running along the outer edge thereof; and, wherein the extension of the downwardly sloping basic axes of at least some of said multiplicity of slot perforations intersects said fin.

10. An arch shape cross section leaching chamber comprising: an unperforated top; a horizontal base; and, inwardly sloped and upwardly curving opposing sidewalls running down from the top to opposing sides of said base, for contacting soil during use; each sidewall having a multiplicity of horizontal lengthwise slots which are spaced apart horizontally and vertically along the sidewalls; each slot flaring inwardly, from the exterior surface of the sidewall to the interior surface of the sidewall; each slot having a horizontal lengthwise opening dimension which is greater than the vertical opening dimension of the slot, as said dimensions are measured at said exterior surface; wherein the basic axes of all the slots on each opposing sidewall slope downwardly at about the same angle, as the basic axes run from the inside to the outside of the chamber sidewall; wherein the slots of said multiplicities of slots have a combination of vertical opening dimension, inward flare and downward slope axis which retards entry into the interior of the chamber of soil which is in contact with the sidewall during use.

11. The chamber of claim 10, wherein said included angle of flare is between 2 and about 12 degrees.

12. The chamber of claim 11, wherein the slope of the basic axes of said multiplicity of perforations which comprise slots is about 12 degrees as measured from the horizontal.

13. The chamber of claim 10, wherein the slot heights measured at the interior of the chamber are in the range of about 0.105 inch to about 0.200 inch.

14. The chamber of claim 10, wherein said included angle of flare is between 2 and about 12 degrees; wherein the slot heights measured at the interior of the chamber are in the range of about 0.105 inch to about 0.200 inch; and wherein the slope of the basic axes of the slots is about 12 degrees as measured from the horizontal.

* * * * *